Sept. 27, 1966 H. A. CAMPBELL, JR., ETAL 3,275,256

SECTIONAL TAPE SPOOL CONSTRUCTION

Filed Jan. 17, 1964

H. Albert Campbell, Jr.
Harold R. Burt
INVENTORS

BY Olvier L. Olson
Agent

United States Patent Office 3,275,256

Patented Sept. 27, 1966

3,275,256

SECTIONAL TAPE SPOOL CONSTRUCTION

H Albert Campbell, Jr., Portland, and Harold R. Burt, Beaverton, Oreg., assignors, by mesne assignments, to K.W.F. Industries, Inc., a corporation of Washington Filed Jan. 17, 1964, Ser. No. 338,346
3 Claims. (Cl. 242—71.8)

This invention relates to magnetic tape recorders, and more particularly to a novel magnetic tape cartridge for use therewith.

This invention represents an improvement over the cartridge construction disclosed in our copending application Serial No. 167,096 filed January 18, 1962, now Patent No. 3,191,881, and entitled Magnetic Tape Cartridge and Feed Assembly for Tape Recorders.

It is the principal object of the present invention to provide a magnetic tape cartridge for the storage and dispensing of magnetic tape, the cartridge having a construction which affords the winding and unwinding of tape relative thereto with minimum frictional resistance, thereby insuring against binding of the tape and consequent damage to a tape recorder associated therewith.

Another important object of this invention is the provision of a magnetic tape cartridge which affords connection of a magnetic tape thereto with maximum speed and facility.

A further important object of the present invention is to provide a magnetic tape cartridge of simplified construction for economical manufacture.

The foregoing and other objects and advantages of this invention will appear from the following detailed description, taken in connection with the accompanying drawing in which.

In its basic concept, the magnetic tape cartridge of the present invention includes a spool component mounted freely and rotatably within a hollow container, the spool component including axially spaced annular discs rotatable with supporting hubs mounted for rotation in the side walls of the container and guiding the magnetic tape between them during winding and unwinding of the tape relative to the spool.

Figures 6, 7:
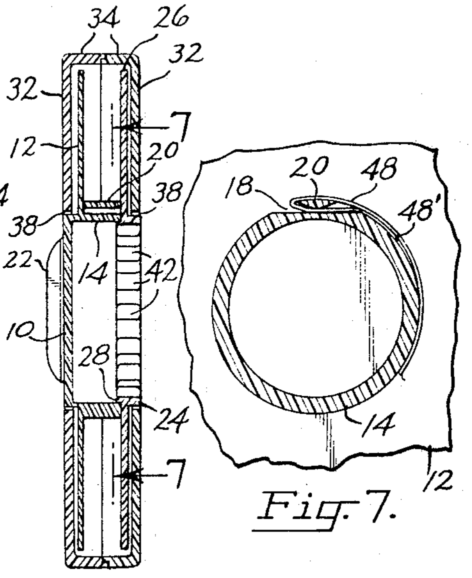
FIG. 6 is a sectional view taken along the line 6—6 in FIG. 5.
FIG. 7 is a fragmentary sectional view taken along the line 7—7 in FIG. 6.

The spool component includes two sections each preferably formed as an integral unit by the well known technique of molding of synthetic thermosetting or thermoplastic resins. The outer section (FIGS. 1 and 2) includes a central hub 10 from which radiates the thin annular disc 12. On the side of the disc opposite the hub and projecting therefrom coaxial with the hub is a tape supporting drum 14. As best illustrated in FIG. 7, this drum preferably is formed as a hollow cylinder to minimize weight. Projecting from the inner end of this cylinder are a plurality of circumferentially spaced pins 16 which serve to join the outer spool section and inner spool section together, as explained more fully hereinafter.

A chord slot 18 is formed in the cylinder 14 intermediate the inner and the outer surfaces thereof and extending longitudinally therethrough. There is thus formed by the outer portion of the cylinder, separated from the remaining portion of the cylinder by the slot, a projecting tab 20 which functions herein as tape fastening means for anchoring the inner end of a magnetic tape, as described in detail hereinafter.

Projecting outwardly from the hub 10 is a raised rib 22 adapted to be gripped between the fingers for rotating the spool component, as explained more fully hereinafter.

The inner spool section (FIGS. 3 and 4) includes a central hub 24 from which radiates the thin annular disc 26. On the side of the disc opposite the hub is an annular shoulder 28 arranged coaxially with the hub and having an outer diameter slightly smaller than the inner diameter of the hollow cylinder 14. Shoulder 28 is adapted to be received snugly within the cylinder, thereby to orient the outer and inner spool sections properly on the same rotational axis. A plurality of openings 30 are provided through the disc for receiving the pins 16 therethrough when the two spool sections are joined together. The pins and openings together comprise what is referred to herein as co-operating means adapted to produce a mechanical interlock locking the two spool sections together for simultaneous rotation. A spot of appropriate plastic cement may be applied between each pin and opening, if desired, to secure the spool sections together as a permanent, integral unit.

Figure 5:
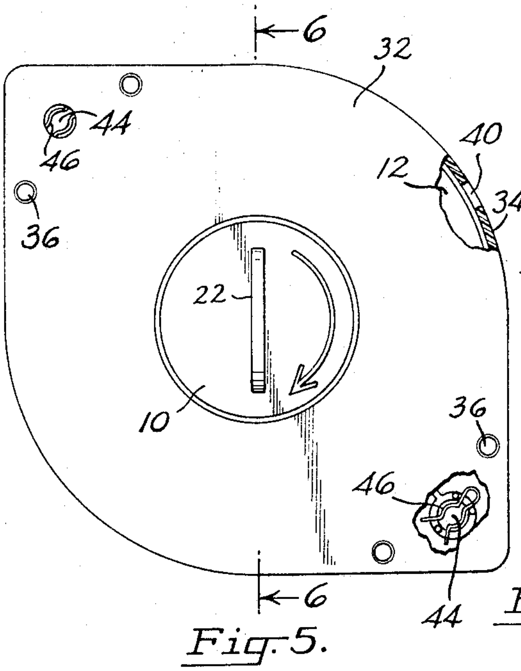
FIG. 5 is a plan view of the assembled cartridge, portions being broken away to disclose details of internal construction.

The assembled spool component is confined rotatably within a hollow container (FIGS. 5 and 6). The container is formed of two longitudinal halves each including an end wall 32 and a peripheral side wall 34. The two halves are arranged with their side wall edges abutting to form the hollow container, said edges preferably being provided with tongue and groove joints to facilitate assembly. The halves are secured together by such means as the rivets 36, or other suitable fastening means. Alternatively, or additionally, the two halves may be secured together along their abutting side edges by means of adhesive.

The end walls 32 of the container are provided with axially aligned central openings 38 for receiving freely therein the oppositely projecting hubs 10 and 24 of the spool sections. The integrated spool component thus is rotatable relative to the container for winding and unwinding tape which extends through an opening 40 in the container side wall 34. This opening is provided by a pair of registering notches one in each side wall of the container halves.

Figures 1, 2, 3, 4:
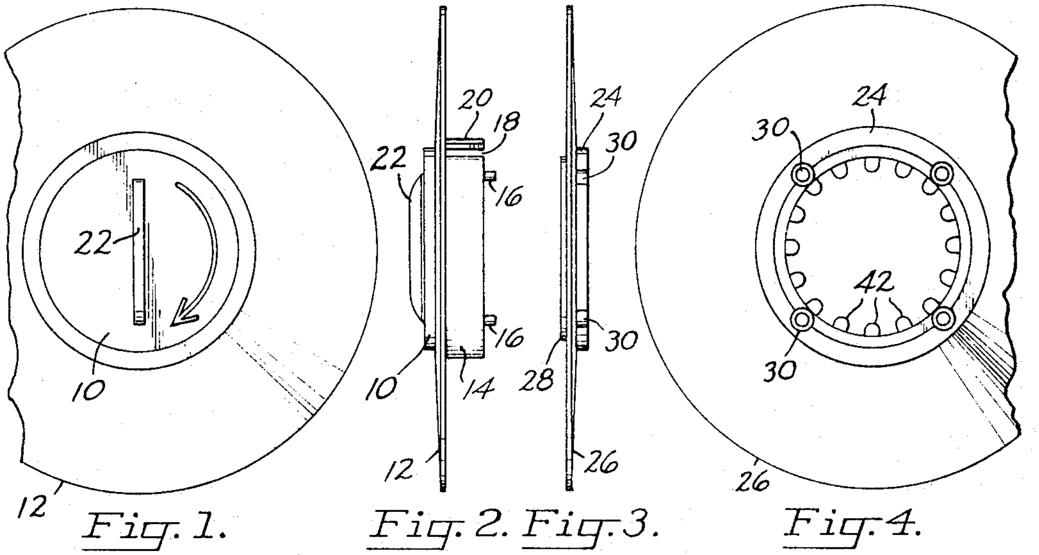
FIG. 1 is a fragmentary plan view of the outer side of the outer spool component of a magnetic tape cartridge embodying the features of the present invention.
FIG. 2 is an end elevational thereof as viewed from the right in FIG. 1.
FIG. 3 is an end elevation of the inner spool section of the cartridge as viewed from the left in FIG. 4.
FIG. 4 is a fragmentary plan view of the inner side of the inner spool section.

As shown in FIGS. 4 and 6, hub 24, disc 26 and shoulder 28 of the inner spool section share a common inner circumferential margin which is irregularly contoured viewing the margin in a direction extending along the rotational axis of the spool section. This irregular contour results from a plurality of radially projecting, circumferentially spaced ribs 42 which are formed integrally with the hub, disc and shoulder in the spool section. These ribs are proportioned and arranged to be received within correspondingly arranged radial grooves formed on a drive hub (not shown) of a tape recorder with which the cartridge is to be used. This arrangement is described in the aforementioned copending application.

Registering pairs of openings 44 are formed in the end walls of the container, adjacent opposite ends of the latter, for mounting the cartridge on a tape recorder. For this purpose, and as fully described in the copending application, the recorder is provided with correspondingly spaced projecting bayonet anchors adapted to extend freely through the openings. Interposed between the container halves and traversing each of the pair of aligned openings is a resilient spring clip 46. The spring clips function to receive the bayonet anchors therethrough, spreading apart resiliently to pass an enlarged head on each anchor and then contracting to resiliently engage a reduced portion of the anchor. The cartridge thus is secured releasably to the tape recorder, with the grooved drive hub of the latter engaging the ribs 42 to effect rotation of the spool component relative to the container.

The inner end of a magnetic tape 48 is secured releasably to the spool component by threading it through the slot 18 sufficiently to provide an end section 48' projecting from the slot and lying against the outer surface of the cylinder 14. The remaining length of the tape then is doubled back over the tab 20 and over the end section of the tape and wrapped about the cylinder. This releasable anchoring of the inner end of the tape provides the advantage that in the event of malfunction of the recorder in failing to stop unwinding the tape before the end is reached, the inner end of the tape will release from the spool and thus prevent damage to the tape drive motor.

From the foregoing it will be apparent that the present invention provides a magnetic tape cartridge of simplified construction, there being only four basic molded sections capable of assembly with speed and facility. The spool component is freely rotatable relative to the inclosing container, and therefore frictional resistance to the winding and unwinding of tape is minimized, since the edges of the tape make contact only with the discs which rotate with the tape.

It will be apparent to those skilled in the art that various changes may be made in the details of construction described hereinbefore without departing from the spirit of this invention and the scope of the appended claims.

Having now described our invention and the manner in which it may be used, what we claim as new and desired to secure by Letters Patent is:

1. A spool component for mounting in a container comprising a first spool section comprising a tape mounting cylinder, and a disc joined to one end of said cylinder radiating from the cylinder at said one end, said cylinder, progressing axially from one side of said disc, having a dimension substantially as wide as the tape to be received by the spool component, and a second spool section comprising an annular disc disposed against the end of said cylinder opposite the cylinder's said one end, and an annular shoulder joined to said annular disc adjacent the inner circumference and on one side thereof, and snugly received within the inside of said cylinder, said shoulder having an inner circumferential margin which is irregularly contoured whereby a driving connection may be established with the spool component through said shoulder, said first and second spool sections including co-operating means producing a mechanical interlock locking the two sections together for simultaneous rotation, said cooperating means comprising at least one opening in one of the spool sections adjacent the inner circumference of said annular disc and located radially outwardly of said inner circumferential margin of said shoulder, and at least one projection joined to the other spool section located radially inwardly of the outer circumference of the cylinder, which projection is received within said opening.

2. The spool component of claim 1 wherein said second spool section includes a hub coaxial with said annular shoulder projecting out from the side of the second section's disc opposite this disc's said one side, said shoulder, hub, and disc of said second section are integral, and said hub includes an inner circumferential margin which is irregularly contoured and a continuation of the irregularly contoured shoulder margin, and outside of said hub providing means for mounting the spool component in a container.

3. The spool component of claim 1 wherein said first spool section includes tape fastening means which, in the spool component is disposed radially outwardly of the inner circumference of said cylinder.

References Cited by the Examiner

UNITED STATES PATENTS

| | | | |
|---|---|---|---|
| 1,462,166 | 7/1923 | Chapman | 242—118.6 X |
| 2,467,607 | 4/1949 | Bates | 242—74 X |
| 2,766,947 | 10/1956 | Hultgren | 242—71.8 |
| 2,989,261 | 6/1961 | Gillette et al. | 242—55.13 |
| 3,119,574 | 1/1964 | Laa | 242—55.13 |
| 3,150,840 | 9/1964 | Briskin et al. | 242—55.13 |
| 3,169,721 | 2/1965 | Laa et al. | 242—55.13 |

FOREIGN PATENTS

| | | |
|---|---|---|
| 1,047,633 | 7/1953 | France. |

FRANK J. COHEN, *Primary Examiner.*

MERVIN STEIN, G. F. MAUTZ, *Examiners.*